April 29, 1924.

F. J. MOSHER

CAR REPLACER

Filed Nov. 15, 1923

1,491,917

F. J. MOSHER
INVENTOR.

BY Fred H Hayn
ATTORNEY.

Patented Apr. 29, 1924.

1,491,917

UNITED STATES PATENT OFFICE.

FRED J. MOSHER, OF LOS ANGELES, CALIFORNIA.

CAR REPLACER.

Application filed November 15, 1923. Serial No. 674,833.

*To all whom it may concern:*

Be it known that I, FRED J. MOSHER, a citizen of the United States, residing at Los Angeles, in the county of Los Angeles and the State of California, have invented a new and useful Improvement in Car Replacers, of which the following is a specification.

This invention relates to improvements in car replacers, and comprises a means whereby a street car or steam railway or other vehicle moving on tracks may be replaced upon said tracks after said car or other vehicle has been accidentally or for other reasons been removed therefrom.

My invention consists of a device capable of being attached to street car, steam railway or other tracks on which a car of any sort may move.

An object of my invention is to provide a simple device, easily manufactured at a small expense, whereby a car or other vehicle, operated upon tracks, may be easily and expeditiously replaced upon said tracks.

It is an object of my invention to provide a car replacer consisting of a device, fashioned in the shape of an inclined plane, and equipped with means whereby it may be anchored to railway or other tracks, said inclined plane being provided with means whereby the wheels of a car may be forced back upon the tracks.

It is also an object of my invention to provide a car replacer in which wheel actuating means are used for forcing said wheels back upon street railway or other tracks.

More specifically, it is the object of my invention to provide a car replacer in which an inclined plane is supplied with side and lower supporting means, a cut-away portion into which the wheels of a vehicle moving upon tracks are adapted to drop, the inclined plane being also provided with means for anchoring it to the tracks, and a means for forcing said wheels back upon said tracks.

In the annexed drawing, which illustrates a form of my invention, like reference characters denote like parts.

Figure 1:
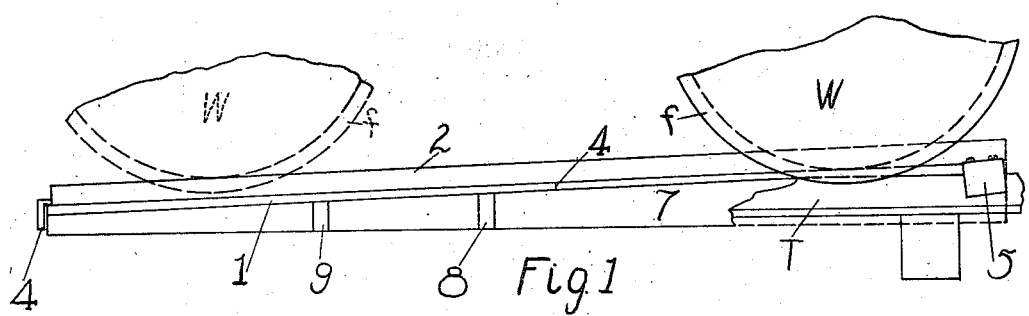
Fig. 1 is a side view of my car replacer anchored in position on a track, one wheel of the car being shown replaced upon said track.
Figure 2:
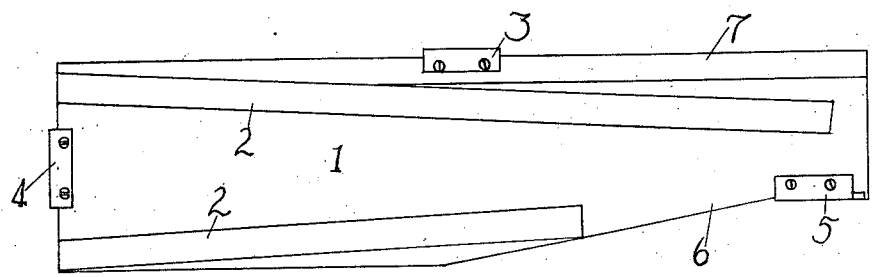
Fig. 2 is a top plan view of the car replacer.
Figure 3:
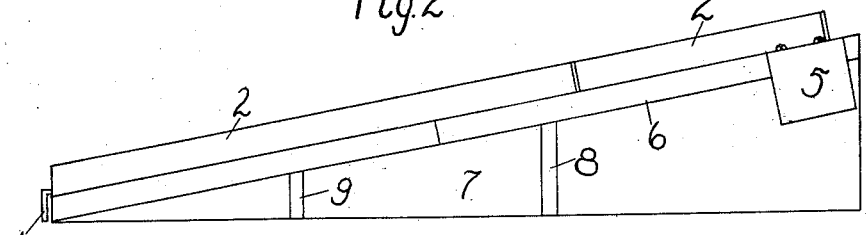
Fig. 3 is a side view thereof.
Figure 5:
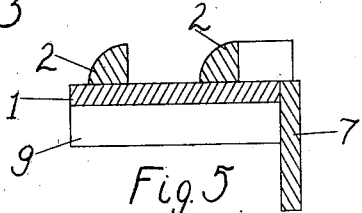
Fig. 5 is a sectional view through the device.

My car replacer consists of an inclined plane 1, to one side of which is secured to or forms part of a side member 7, which side member forms a supporting means for said inclined plane.

The inclined plane 1 has a cut-away portion 6 to allow the wheels W of a street car or other vehicle to drop in place on the track T.

Anchoring means 3, secured to the side member 7 in any preferred manner, and a second anchoring means 4, secured to one end of the inclined plane 1, both of which may be a hook, angle iron, or any preferred securing means, permit the inclined plane to be anchored in position so that movement thereof is prevented.

The numeral 5 designates a hook, angle iron or similar device, whereby the inclined plane may be anchored to the track T.

The numerals 8 and 9 denote additional supporting means, secured to the bottom of the inclined plane 1, to form additional means for supporting said plane.

The inclined plane 1, preferably constructed of wrought iron, has fastened to the top portion thereof ways 2 in any chosen manner. These ways 2 are desirably quarter-round in form, and are so positioned that they gradually approach each other toward the cut-away portion 6, for the purpose presently to be explained.

Figure 4:
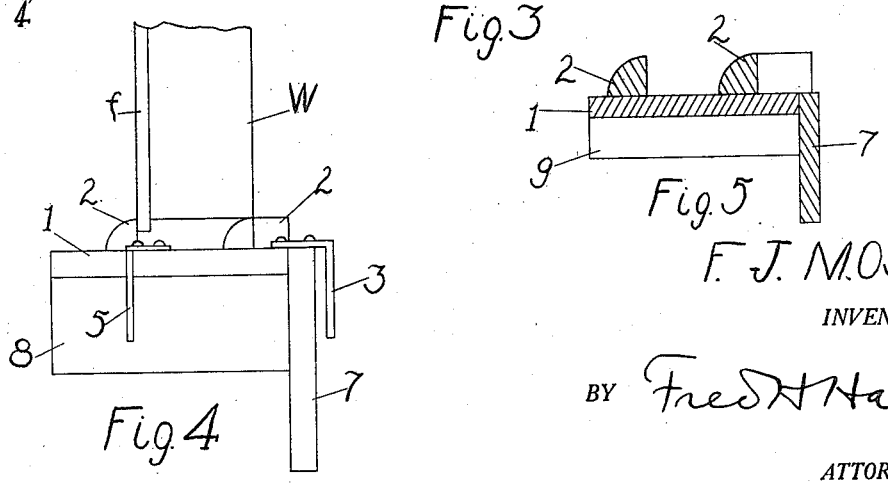
Fig. 4 is a end view, on a somewhat enlarged scale, showing a fragmentary view of a car wheel in position on the device.

As shown in Fig. 4, the wheel W of a car or other vehicle moving upon tracks is adapted to ride over the ways 2, the flange *f* of said wheel abutting one of said ways 2 as shown, the remaining portion of said wheel resting upon the other of said ways. Placing the quarter-round way upon which the wheel W rests in the manner shown obviates the necessity of greasing said ways.

In operation, the car replacer is placed in position on the track T, the hook or other anchoring means 5 embracing said track. The device is then anchored in position against movement by the hooks or other anchoring means 3 and 4.

Power being applied to the street car or other vehicle, the wheels W ride on to the inclined plane 1, the flange $f$ of the wheels abutting one of the ways 2, while the remaining portion of said wheels ride on the other of said ways.

It is clear that the ways 2, positioned as they are, on the inclined plane 1, gradually force said wheels toward the track T until they reach the cut-away portion 6, when they then drop upon the track. The car being replaced upon the track, my car replacer may be easily and quickly removed from its position, the operation occupying but a very short time.

It is obvious that my invention is a practical, easily and inexpensively manufactured device whereby a car or other vehicle moving on tracks may be replaced upon said tracks effectively and in an exceedingly short time.

I am aware that various details of construction may be varied without departing from the principles of my invention, and that modifications thereof may be made within the scope of the appended claims.

I claim as my invention:

1. An article of manufacture comprising a car replacer, an inclined plane, supports attached to the lower portion of said inclined plane, side supporting means fastened to said plane, said inclined plane being provided with a cut-away portion, ways fastened to the top of said inclined plane, said ways being rounded to obviate greasing the same, said ways being so positioned that they gradually approach each other toward said cut-away portion, means for anchoring said inclined plane to a track, and means on one end of and also on one side of said inclined plane whereby said plane is prevented from being moved, substantially as described.

2. In a car replacer, an inclined plane, means fastened to said plane for supporting the same; means on said plane whereby the wheels of a car or other vehicle moving upon tracks are gradually forced upon said tracks, a cut-away portion on said inclined plane for permitting said wheels to drop on said tracks, means for anchoring said inclined plane on said tracks, and means whereby said plane is prevented from moving, substantially as described.

3. In a car replacer, an inclined plane, a side member secured to said plane for supporting the same, lower members secured to the under side of said plane, which members are adapted to provide additional means for supporting said plane, a first anchoring member positioned on said plane in juxtaposition with said side member, a second anchoring member placed on one end of said inclined plane, a third anchoring member attached to the end of said inclined plane, opposite to that end to which the second anchoring member is attached, said three anchoring members being adapted to prevent the car replacer from being moved from position and anchoring it to a track, and means on said inclined plane whereby the wheels of a car may be forced back upon said track, substantially as described.

FRED J. MOSHER.

Witnesses:
LOREN E. GODWIN,
MYRTLE G. MOSHER.